(12) United States Patent
Hirsch et al.

(10) Patent No.: US 9,137,816 B2
(45) Date of Patent: *Sep. 15, 2015

(54) COEXISTENCE TIMER MECHANISM FOR WIRELESS COMMUNICATION SYSTEMS

(71) Applicant: QUALCOMM Incorporated, San Diego, CA (US)

(72) Inventors: Olaf J Hirsch, Sunnyvale, CA (US); Bharath Bhoopalam, San Jose, CA (US); Shriram Krishnan, Sunnyvale, CA (US); Manev Luthra, Santa Clara, CA (US); Peter Van Horn, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 334 days.

This patent is subject to a terminal disclaimer.

(21) Appl. No.: 13/667,913

(22) Filed: Nov. 2, 2012

(65) Prior Publication Data
US 2013/0058316 A1 Mar. 7, 2013

Related U.S. Application Data

(63) Continuation of application No. 12/717,196, filed on Mar. 4, 2010, now Pat. No. 8,335,206.

(51) Int. Cl.
*H04J 3/06* (2006.01)
*H04W 72/12* (2009.01)

(52) U.S. Cl.
CPC ................................. *H04W 72/1215* (2013.01)

(58) Field of Classification Search
CPC . H04L 47/10; H04L 2012/5631; H04L 47/15; H04L 47/2441; H04L 47/70; H04W 80/04; H04W 8/26; H04W 56/00; H04W 56/0045; H04W 72/04; H04W 88/08; H04W 76/00; H04W 84/08; H04B 7/2125; H04B 7/2126; H04B 7/2662; H04J 2011/0096
USPC .......... 370/310, 349, 324, 350, 252, 329, 341
See application file for complete search history.

(56) References Cited

U.S. PATENT DOCUMENTS

| 6,820,031 | B1 | 11/2004 | Hayakawa |
| 7,046,649 | B2 | 5/2006 | Awater et al. |

(Continued)

OTHER PUBLICATIONS

Bluetooth, "Bluetooth Core Specification Version 3.0", vol. 2. part B: Core System Package [Controller volume] http://www.bluetooth.com/Bluetooth/Technologyuilding/Specifications/ (Obtained Gom the Internet Nov. 4, 2009) Apr. 21, 2009 , pp. 59-206.

(Continued)

*Primary Examiner* — Brenda H Pham
(74) *Attorney, Agent, or Firm* — DeLizio Law, PLLC

(57) ABSTRACT

A common coexistence timer can be implemented on collocated or proximate wireless radio devices so that timing information associated with scheduled communications of each of the wireless radio devices is communicated with a common time reference. The coexistence timer provides the common time reference for the wireless radio devices. A transmitting wireless radio device can calculate a difference time associated with the timing information of a scheduled communication and can provide the difference time to a receiving wireless radio device. The receiving wireless radio device can convert the difference time into a time format corresponding to the receiving wireless radio device's local time reference. This can minimize interference between the collocated or proximate wireless radio devices, thus minimizing performance degradation, packet collision, and interference. Moreover, this also can eliminate timing errors due to the wireless radio devices using different timers operating at different frequencies or being synchronized to different crystals.

33 Claims, 10 Drawing Sheets

(56) References Cited

U.S. PATENT DOCUMENTS

| | | | |
|---|---|---|---|
| 7,876,704 B1* | 1/2011 | Bims et al. | 370/254 |
| 8,249,031 B1* | 8/2012 | Hirsch et al. | 370/336 |
| 8,335,206 B1* | 12/2012 | Hirsch et al. | 370/350 |
| 2007/0081514 A1* | 4/2007 | Shirokura et al. | 370/350 |
| 2010/0034190 A1 | 2/2010 | Yun et al. | |

OTHER PUBLICATIONS

Co-pending U.S. Appl. No. 12/236,604, filed Sep. 24, 2008.
Co-pending U.S. Appl. No. 12/620,270, filed Nov. 17, 2009.
Co-pending U.S. Appl. No. 12/633,150, filed Dec. 8, 2009.
Co-pending U.S. Appl. No. 12/639,207, filed Dec. 16, 2009.
Co-pending U.S. Appl. No. 12/651,871, filed Jan. 4, 2010.
"CSR Bluetooth and IEEE 802.11b Co-Existence Solution", CSR BlueCore 2-External Feb. 2003, 20 pages.
"CSR Co-Existence Scheme Definition", BlueCore 3-External Nov. 2003, 8 pages.
"How 802.11b/g WLAN and Bluetooth Can Play", Philips Sep. 2005, 5 pages.
"Three Wire Interface", Infineon Technologies Functional Design Document Oct. 4, 2004, 6 pages.
"Wi-Fi and Bluetooth—Interference Issues", Hewlett Packard Jan. 2002, 6 pages.
"U.S. Appl. No. 12/717,196 Office Action", Apr. 19, 2012, 8 pages.

\* cited by examiner

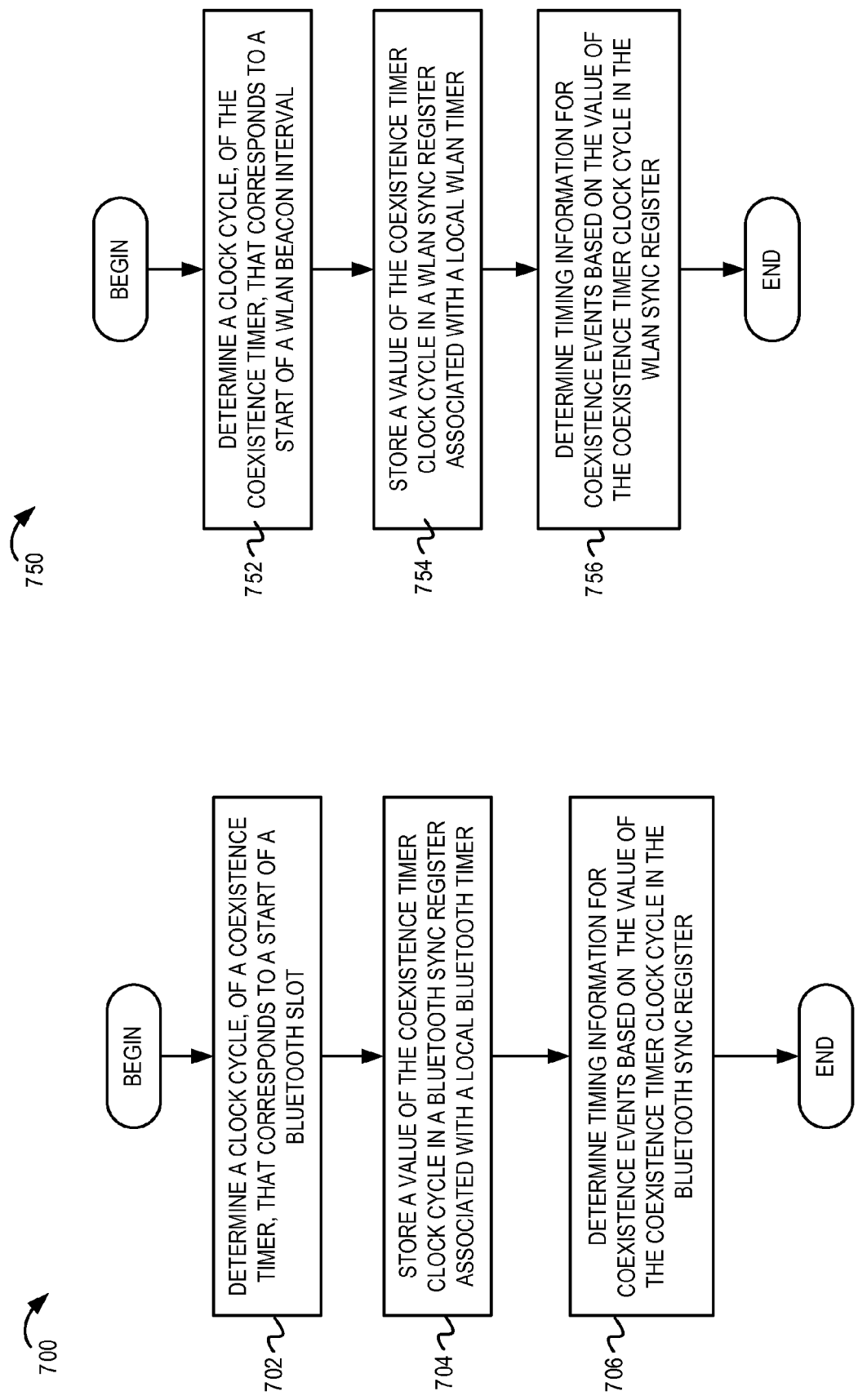

COEXISTENCE TIMER MECHANISM FOR WIRELESS COMMUNICATION SYSTEMS

RELATED APPLICATIONS

This application is a continuation of U.S. application Ser. No. 12/717,196 filed on Mar. 4, 2010.

BACKGROUND

Embodiments of the inventive subject matter generally relate to the field of wireless communications and, more particularly, to a coexistence timer mechanism for enabling coexistence in a wireless communication system.

When wireless devices are in close proximity to each other, communication from one wireless device may interfere with communication from the other wireless device. For example, when Bluetooth® and wireless local area network (WLAN) devices operate in close proximity to each other, the radio protocol of one device can interfere with the radio protocol of the other device. The Bluetooth device can use adaptive frequency hopping (AFH) techniques to avoid frequencies on which a WLAN transmission is detected. Packet traffic arbitration (PTA) wires may also be used to provide dynamic information to the wireless devices to prevent the Bluetooth and WLAN devices from transmitting at the same time.

SUMMARY

Various embodiments of a coexistence timer mechanism for enabling coexistence in a wireless communication system are disclosed. In one embodiment, timing information of a scheduled communication of a first wireless network device of the communication system is determined. A time value of a coexistence timer is identified. The coexistence timer provides a common time reference for the first wireless network device and a second wireless network device of the communication system. A difference time associated with the timing information of the scheduled communication of the first wireless network device is calculated based on the time value of the coexistence timer. The difference time is provided to the second wireless network device of the communication system to indicate a timing associated with the scheduled communication of the first wireless network device.

BRIEF DESCRIPTION OF THE DRAWINGS

The present embodiments may be better understood, and numerous objects, features, and advantages made apparent to those skilled in the art by referencing the accompanying drawings.

FIG. 7A is a flow diagram illustrating example operations for synchronizing a local Bluetooth timer with a coexistence timer, according to some embodiments;

FIG. 7B is a flow diagram illustrating example operations for synchronizing a local WLAN timer with a coexistence timer, according to some embodiments;

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to calculating and transmitting timing information of various coexistence events to enable coexistence between a wireless local area network (WLAN) device and a Bluetooth device, in other embodiments communication may be scheduled for other wireless standards and devices, e.g., WiMAX, ZigBee®, Wireless USB devices, etc. In other instances, well-known instruction instances, protocols, structures, and techniques have not been shown in detail in order not to obfuscate the description.

Interference between wireless radio devices (e.g., a Bluetooth device and a WLAN device) may be caused when the wireless radio devices are collocated on a common system and/or are communicating (e.g., transmitting or receiving signals) in close proximity to each other. Such interference between the collocated wireless radio devices can result in performance degradation. The wireless radio devices can schedule communications to prevent packet collision and interference by exchanging information about coexistence events. Although the wireless radio devices communicate timing information of the coexistence events in terms of absolute time values, the wireless radio devices may use different timers (e.g., with different clock cycles, operating at different frequencies, with different time references, etc.) to maintain timing on local wireless radio devices. A common coexistence timer implemented on the wireless radio devices can ensure that the timing information of coexistence events is communicated with a common time reference. A transmitting wireless radio device may convert the timing information from its local time reference into the common time reference before providing the timing information to a receiving wireless radio device. The receiving wireless radio device may convert (if necessary) from the common time reference into its local time reference. With the common time reference, either of the wireless radio devices can translate the timing information of the coexistence events into their respective local time reference without being affected by delays associated with the exchange of information.

Figure 1:
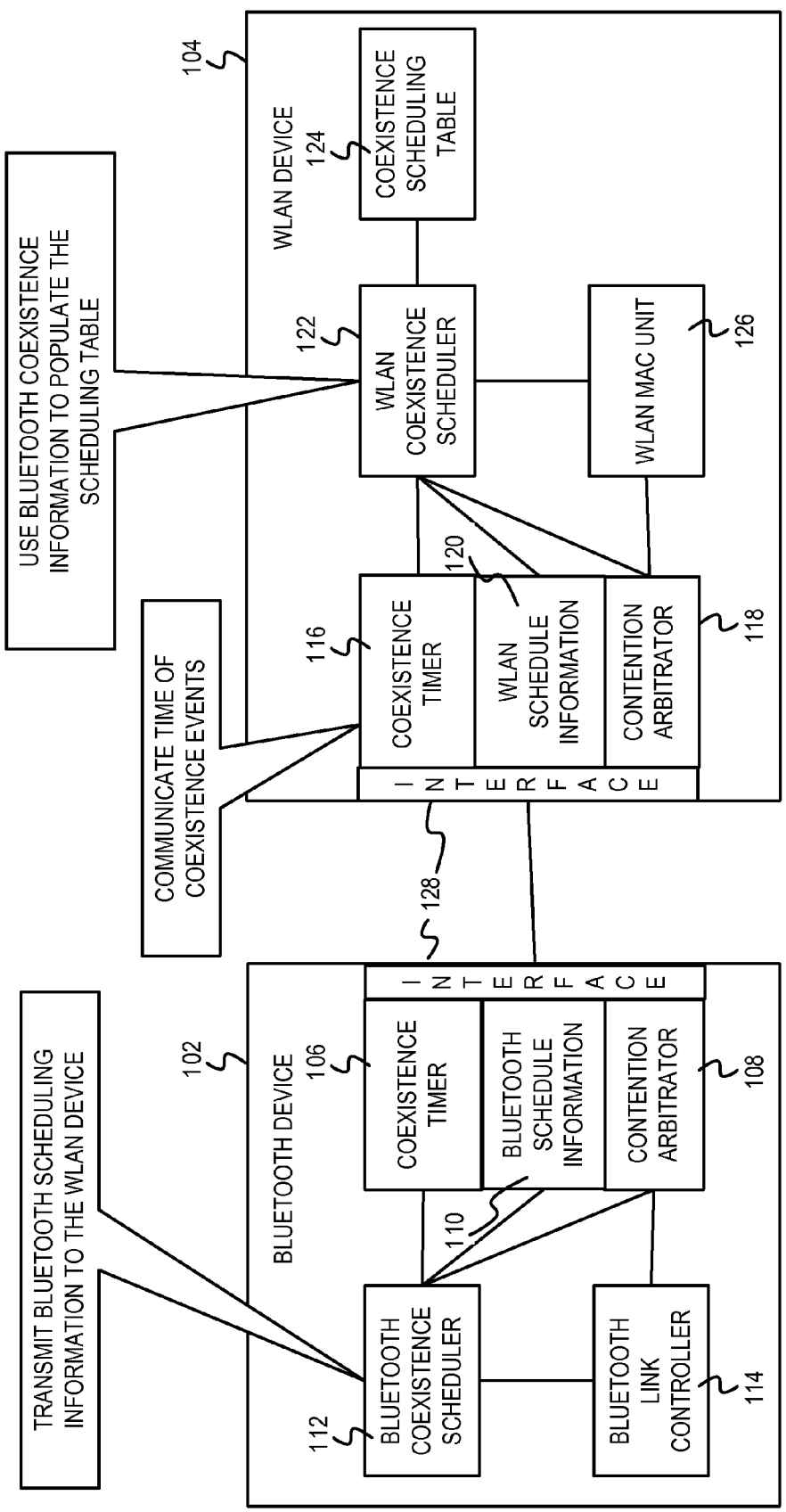
FIG. 1 is an example conceptual diagram illustrating a single chip or a two-chip coexistence architecture for a collocated WLAN and Bluetooth device, according to some embodiments.

FIG. 1 is an example conceptual diagram illustrating single-chip or two-chip coexistence architecture for WLAN and Bluetooth devices, according to some embodiments. As illustrated in FIG. 1, in some implementations, a Bluetooth device 102 and a WLAN device 104 can be embodied on distinct chips (e.g., distinct Bluetooth and WLAN integrated circuits, etc). In other implementations, the Bluetooth device 102 and a WLAN device 104 can be embodied on a single chip (e.g., a system on a chip (SoC), an integrated circuit, etc.). The Bluetooth device 102 and the WLAN device 104 may be located on a common electronic device (e.g., a computer system, a mobile phone, etc).

In some implementations, the Bluetooth device 102 comprises a Bluetooth coexistence scheduler 112, a Bluetooth link controller 114, a coexistence timer 106, Bluetooth schedule information 110, and a contention arbitrator 108. The Bluetooth coexistence scheduler 112 communicates with the Bluetooth link controller 114, the coexistence timer 106, and the contention arbitrator 108. The Bluetooth coexistence scheduler 112 generates the Bluetooth schedule information 110. Additionally, the contention arbitrator 108 communicates with the Bluetooth link controller 114.

In some implementations, the WLAN device 104 comprises a WLAN coexistence scheduler 122, a WLAN medium access control (MAC) unit 126, a coexistence timer 116, WLAN schedule information 120, a contention arbitrator 118, and a coexistence table 124. The WLAN coexistence scheduler 122 communicates with the WLAN MAC unit 126, the coexistence timer 116, and the contention arbitrator 118. The WLAN coexistence scheduler 112 generates the WLAN schedule information 120. The WLAN coexistence scheduler 122 also generates the coexistence table 124, which comprises the Bluetooth schedule information 110. Additionally, the contention arbitrator 118 communicates with the WLAN MAC unit 126.

The Bluetooth device 102 and the WLAN device 104 communicate via interface 128. In one implementation, the interface 128 can be a physical interface comprising wires connecting the Bluetooth device 102 and the WLAN device 104. In another implementation, the interface 128 can be a message-based coexistence interface over which messages comprising coexistence information are exchanged between the Bluetooth device 102 and the WLAN device 104.

The Bluetooth device 102 uses the coexistence timer 106 to communicate the time of coexistence events. For example, the Bluetooth coexistence scheduler 112 may transmit a start time and an end time of a Bluetooth packet in accordance with the coexistence timer 106 via the interface 128. The contention arbitrators 108 and 118 are used if packets to be transmitted/received by either the Bluetooth device 102 or the WLAN device 104 respectively cannot be scheduled without corrupting the packets and resulting in interference. The Bluetooth coexistence scheduler 112 provides timing information of Bluetooth communications ("Bluetooth timing information") to the WLAN coexistence scheduler 122, sets Bluetooth packet priorities for contention control, and programs the Bluetooth link controller 114 to transmit and receive Bluetooth packets.

The WLAN coexistence scheduler 122 receives the coexistence timing information from the Bluetooth coexistence scheduler 112 via the interface 128. The WLAN coexistence scheduler 122 schedules transmission of WLAN packets such that collisions between communications of the Bluetooth device 102 and the WLAN device 104 are minimized. The WLAN coexistence scheduler 122 also provides timing information of WLAN communications ("WLAN timing information") to the Bluetooth coexistence scheduler 112. The WLAN coexistence scheduler 122 also sets the WLAN packet priorities and programs the WLAN MAC unit 126 to transmit and receive WLAN packets.

Figure 2:
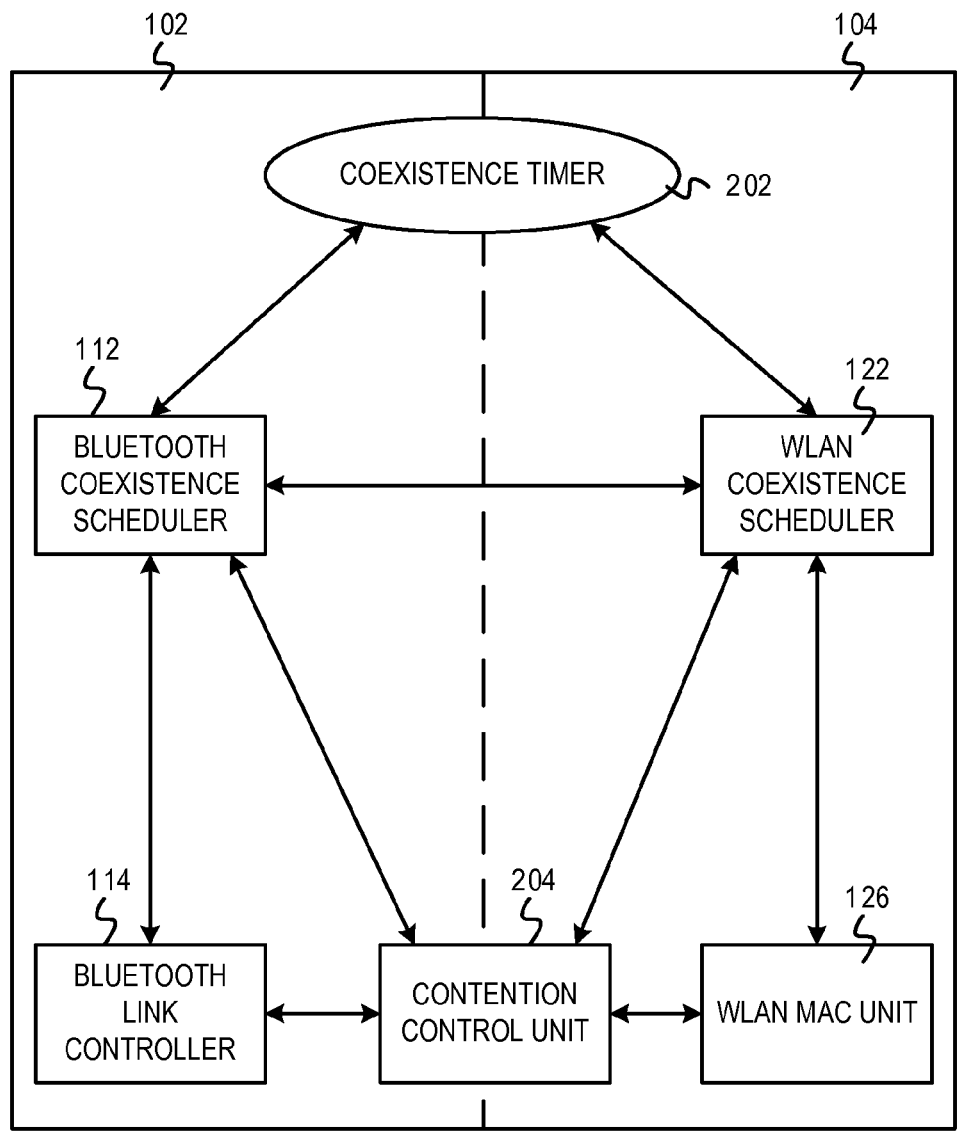
FIG. 2 is an example conceptual diagram illustrating functional architecture for a collocated WLAN and Bluetooth device, according to some embodiments.

FIG. 2 is an example conceptual diagram illustrating functional architecture for a collocated WLAN and Bluetooth device, according to some embodiments. The functional architecture 200 comprises the collocated Bluetooth device 102 and a WLAN device 104. As described above, in some implementations, the Bluetooth device 102 and the WLAN device 120 can be embedded on a common chip (e.g., a system on a chip (SoC), an integrated circuit, etc.) within an electronic device (e.g., a computer system, a mobile phone, etc).

In some implementations, the Bluetooth device 102 comprises the Bluetooth coexistence scheduler 112 and the Bluetooth link controller 114. The Bluetooth coexistence scheduler 112 communicates with the Bluetooth link controller 114. The WLAN device 104 comprises the WLAN coexistence scheduler 122 and the WLAN MAC unit 126. The WLAN coexistence scheduler 122 communicates with the WLAN MAC unit 126. The Bluetooth device 102 and the WLAN device 104 share a coexistence timer 202 and a contention control unit 204. The Bluetooth coexistence scheduler 112 and the WLAN coexistence scheduler 122 are coupled with the coexistence timer 202. The contention control unit 204 is coupled with the Bluetooth coexistence scheduler 112, the WLAN coexistence scheduler 122, the Bluetooth link controller 114, and the WLAN MAC unit 126.

As described with reference to FIG. 1, the coexistence timer 202 is used to communicate timing information of coexistence events (e.g., a start time of a packet transmission). In one implementation, the coexistence timer 202 can be a 32-bit free running timer with a resolution of 1 microsecond. The contention control unit 204 is used if communications of the WLAN device 104 and the Bluetooth device 102 cannot be scheduled without corrupting one/both communications. The contention control unit 204 may resolve contention based on priority of Bluetooth communications received from the Bluetooth coexistence scheduler 112 and priority of WLAN communications received from the WLAN coexistence scheduler 122. In another implementation, the contention control unit 204 may resolve contention based on a start time of the communications. The Bluetooth coexistence scheduler 112 provides Bluetooth timing information to the WLAN coexistence scheduler 122 and directs the Bluetooth link controller 114 to transmit and receive Bluetooth packets. Likewise, the WLAN coexistence scheduler 112 provides WLAN timing information to the Bluetooth coexistence scheduler 112 and directs the WLAN MAC unit 126 to transmit and receive WLAN packets.

Because the Bluetooth device 102 and the WLAN device 104 can each have their own coexistence timer (as indicated in the two-chip architecture of FIG. 1), the coexistence timers should be synchronized. In one implementation, synchronization between the two coexistence timers can be achieved by communicating a time of the coexistence events relative to the time indicated by a local coexistence timer (e.g., the coexistence timer 106 for the Bluetooth device 102 and the coexistence timer 116 for the WLAN device 104). A transmitting device can calculate the relative time by subtracting a current value of its local coexistence timer from the absolute value of the time of the coexistence events. A receiving device can add a current value of its local coexistence timer to the relative time to recreate the timing information of the coexistence event. This concept is further described with reference to FIG. 3.

Figure 3:
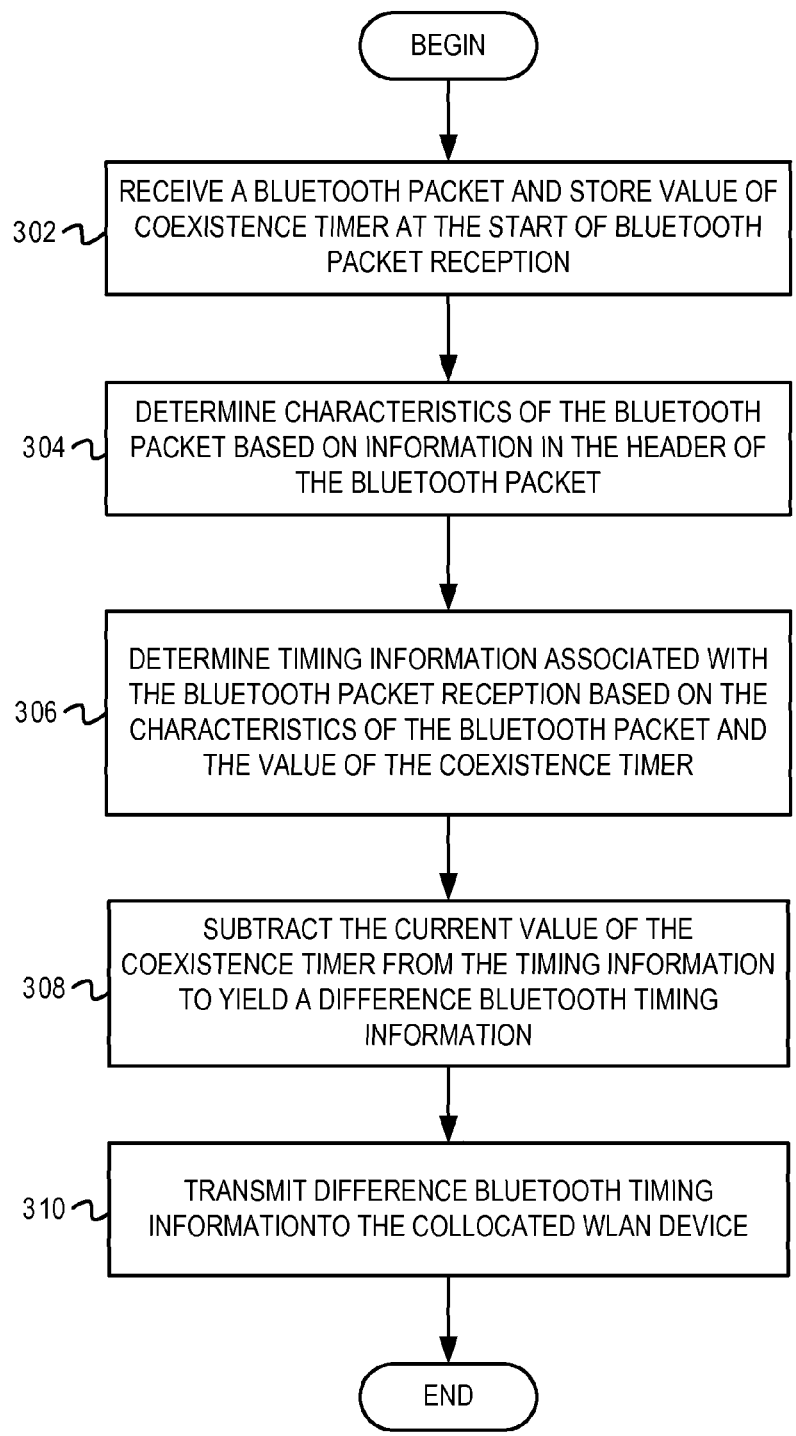
FIG. 3 is a flow diagram illustrating example operations for communicating coexistence timing information, according to some embodiments.

FIG. 3 is a flow diagram illustrating example operations for communicating coexistence timing information, according to some embodiments. Flow 300 begins at block 302.

Figure 4A:
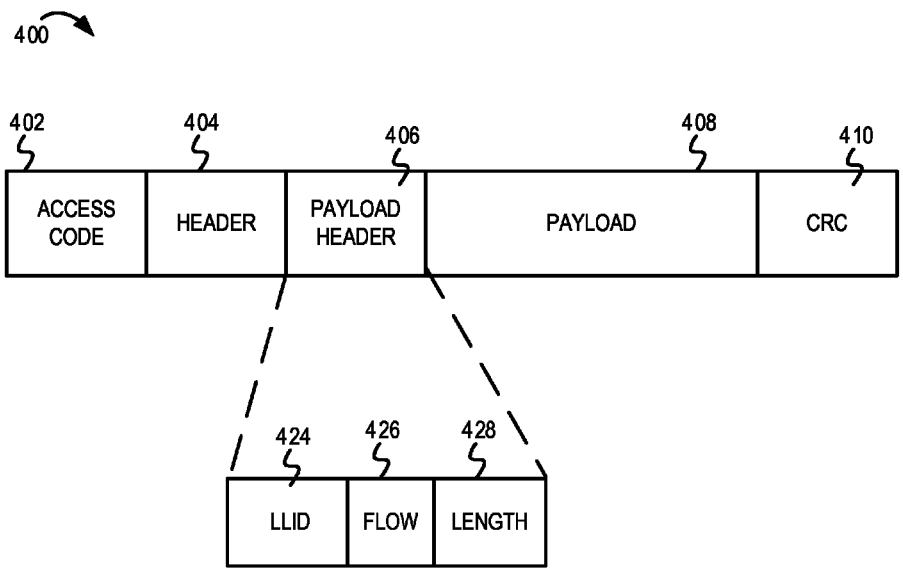
FIG. 4A illustrates an example format of a Bluetooth packet, according to some embodiments.
Figure 4B:
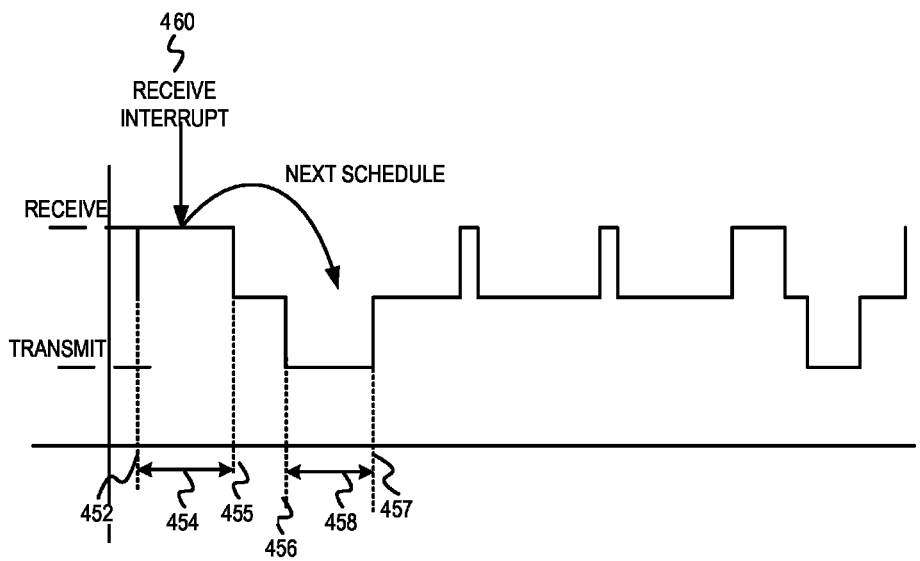
FIG. 4B illustrates an example communication schedule for the Bluetooth device, according to some embodiments.

At block 302, a Bluetooth packet is received and a value of a coexistence timer at the start of the Bluetooth packet reception is stored. For example, the Bluetooth link controller 114 of the Bluetooth device 102 (shown in FIG. 1) may receive the Bluetooth packet. The current value of the coexistence timer may be stored at the start of a Bluetooth slot boundary that corresponds to the start of the Bluetooth packet reception. FIG. 4B illustrates an example communication schedule for the Bluetooth device, according to some embodiments. As depicted in FIG. 4B, the Bluetooth packet reception begins at time instant 452. The value of the coexistence timer at the time instant 452 is stored. The flow continues at block 304.

At block 304, characteristics of the Bluetooth packet are determined based on information in the header of the Bluetooth packet. FIG. 4A illustrates an example format of a Bluetooth packet 400, according to some embodiments. The Bluetooth packet 400 comprises an access code 402, a header 404, a payload header 406, a payload 408, and a cyclic redundancy check (CRC) field 410. The payload header 406 comprises a logical link identifier (LLID) 424, a flow field 426, and a length field 428. The Bluetooth coexistence scheduler 112 can determine the duration of the ongoing Bluetooth packet reception based on content of the length field 428. The Bluetooth coexistence scheduler 112 can also determine the type of the Bluetooth packet of the ongoing Bluetooth packet reception. For example, based on an indication in the header 404, it may be determined that the Bluetooth packet being received is a Synchronous communication (SCO) packet. The flow continues at block 306.

At block 306, timing information associated with the Bluetooth packet reception is determined based on the characteristics of the Bluetooth packet and the value of the coexistence timer. In some implementations, the timing information may be determined based on information in a Bluetooth coexistence scheduler (e.g., the Bluetooth coexistence scheduler 112). The timing information may comprise a start time and a stop time of the Bluetooth packet reception. For example, based on knowledge of the value of the coexistence timer (determined at block 302) and the duration of the Bluetooth packet reception (determined at block 304), the Bluetooth coexistence scheduler 112 can calculate the stop time of the Bluetooth packet reception.

The Bluetooth coexistence scheduler 112 may determine the timing information of the Bluetooth packet reception in response to a notification indicating that the Bluetooth link controller 114 has received a payload header of the Bluetooth packet. In another implementation, the Bluetooth link controller 114 may generate a receive interrupt after the Bluetooth link controller 114 decodes the payload header of the Bluetooth packet. In FIG. 4B, the receive interrupt 460 is generated after the payload header 406 is received. From the payload header 406 and the value of the coexistence timer at the time instant 452 (i.e., the value of the coexistence timer at the beginning of the Bluetooth packet reception), the Bluetooth coexistence schedule 112 can determine that the Bluetooth packet reception has a duration indicated by time interval 454 and will end at time instant 455.

In some implementations, timing information associated with the next Bluetooth communication of the Bluetooth device 102 may also be determined based on the characteristics and the timing information of the ongoing Bluetooth packet reception. The next Bluetooth communication may be a Bluetooth packet transmission or a Bluetooth packet reception. In response to the generation of the receive interrupt after the reception and/or decoding of the payload header, the Bluetooth coexistence scheduler 112 can calculate a schedule of the next Bluetooth communication with knowledge of the duration of the ongoing Bluetooth packet reception. With knowledge of a packet type of the ongoing Bluetooth packet reception, the Bluetooth coexistence scheduler 112 can also determine the start time of the next Bluetooth packet transmission and/or the next Bluetooth packet reception. For example, the schedule of the next Bluetooth packet reception may be predicted based on an indication (e.g., in the header 404) that the Bluetooth packet being received is a Synchronous communication (SCO) packet. The Bluetooth coexistence scheduler 112 may also schedule a Bluetooth packet transmission. In one implementation, the duration of the Bluetooth packet transmission may be determined by data in a transmit queue. In another implementation, the Bluetooth coexistence scheduler 112 can determine the amount of time available for transmission of Bluetooth packets based on knowledge of the next Bluetooth packet reception. The Bluetooth coexistence scheduler 112 can also determine the start and the stop time for the Bluetooth packet transmission and the length of the Bluetooth packet based on knowledge of the next Bluetooth packet reception. Also, in some implementations, the Bluetooth coexistence scheduler 112 may vary the length of the Bluetooth packet scheduled to be transmitted until the start time of the Bluetooth packet transmission. In other implementations, the Bluetooth coexistence scheduler 112 may estimate and fix the length of the Bluetooth packet scheduled to be transmitted on detecting the receive interrupt.

In the example illustrated in FIG. 4B, after the receive interrupt 460, the Bluetooth coexistence scheduler 112 determines a start time 456 of the next Bluetooth packet transmission, calculates the duration of the Bluetooth packet transmission as indicated by a time interval 458, and determines a stop time 457 of the Bluetooth packet transmission. The Bluetooth coexistence scheduler 112 may calculate the duration of the Bluetooth packet transmission based on amount of data to be transmitted, available time between Bluetooth packet receptions, etc. The Bluetooth coexistence scheduler 112 may also determine (if possible) the schedule for the next Bluetooth packet reception. Referring back to FIG. 3, after the timing information of the next Bluetooth communication is determined, the flow continues at block 308.

Figure 6:
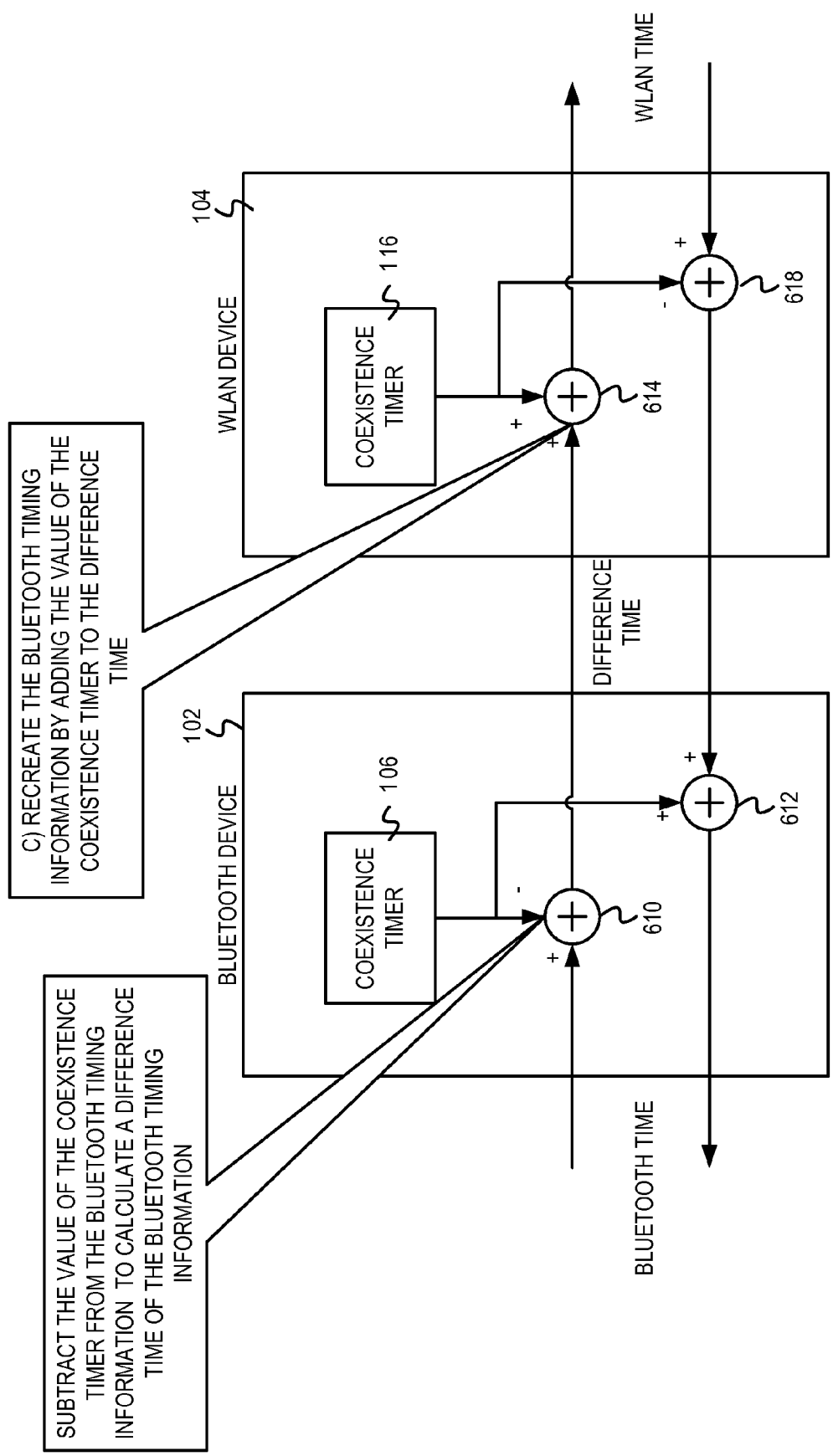
FIG. 6 illustrates calculating and transmitting difference timing information of coexistence events, according to some embodiments.

At block 308, the current value of the coexistence timer is subtracted from the timing information to yield a difference time of the Bluetooth communications ("difference Bluetooth timing information"). In one implementation, the Bluetooth link controller 114 may obtain the timing information of the next Bluetooth communication, and also the value of the coexistence timer from the Bluetooth coexistence scheduler 112. FIG. 6 illustrates the concept of calculating and transmitting the difference Bluetooth timing information, according to some embodiments. FIG. 6 depicts the Bluetooth device 102 and the WLAN device 104. The Bluetooth device 102 and the WLAN device 104 comprise the coexistence timers 106 and 116, respectively. Additionally, the Bluetooth device 102 comprises a subtractor 610 that subtracts the value of the coexistence timer 106 from the timing information of the next Bluetooth communication to yield the difference Bluetooth timing information. The difference Bluetooth timing information is transmitted to the WLAN device 104. In some implementations, operations for determining the current value of the coexistence timer 116 and subtracting the current value of the coexistence timer 116 from the timing information may be performed in hardware. Likewise, the WLAN device 104 comprises a subtractor 614 that subtracts the value of the coexistence timer 116 from the timing information of the next WLAN communication to yield a difference time of the WLAN communication ("difference WLAN timing information"). The difference WLAN timing information is transmitted to the Bluetooth device 102. It should be noted that all subtractions performed in the WLAN device 104 and in the Bluetooth device 102 may be performed modulo to the period of the coexistence timer. Referring back to FIG. 3, after the difference Bluetooth timing information is calculated, the flow continues at block 310.

At block 310, the difference Bluetooth timing information is transmitted to the collocated WLAN device. For example, the Bluetooth link controller 114 may transmit the difference Bluetooth timing information in a coexistence message to the WLAN device 104. The WLAN device 104 adds a current value of its coexistence timer to the received difference Bluetooth timing information to determining timing information associated with Bluetooth communications, as will be described below with reference to FIG. 5. Based on the difference Bluetooth timing information of the next Bluetooth communication (e.g., based on the start time of the next Bluetooth communication) and based on the difference Bluetooth timing information of the ongoing Bluetooth communication (e.g., based on the duration of the ongoing Bluetooth communication), the WLAN device 104 can determine how to schedule its communications. From block 310, the flow ends.

Figure 5:
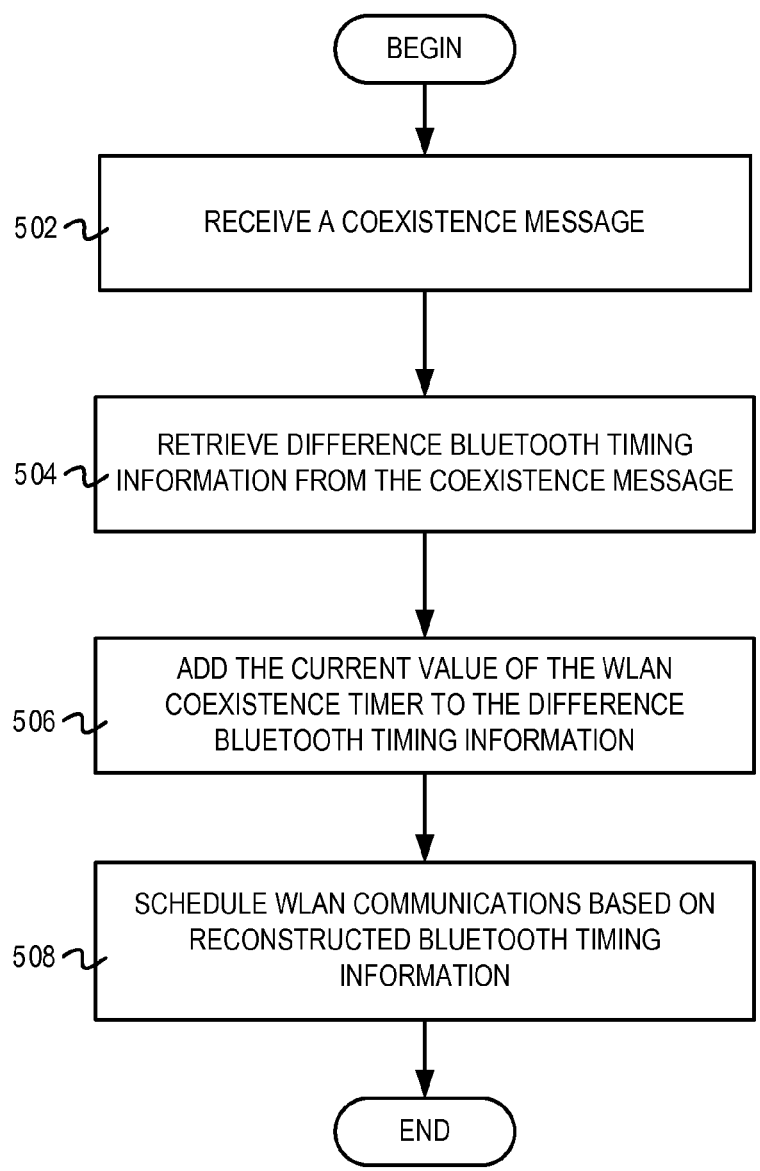
FIG. 5 is a flow diagram illustrating example operations for receiving and translating difference timing information of coexistence events, according to some embodiments.

FIG. 5 is a flow diagram illustrating example operations for receiving and translating difference timing information of coexistence events, according to some embodiments. Flow 500 begins at block 502.

At block 502, a coexistence message is received. For example, the WLAN device 104 of FIG. 1 may receive the coexistence message, via the interface 128, from the Bluetooth device 102. In one implementation, the WLAN MAC unit 126 may receive the coexistence message and provide the coexistence message to the WLAN coexistence scheduler 122. The flow continues at block 504.

At block 504, difference Bluetooth timing information is retrieved from the coexistence message. For example, the WLAN coexistence scheduler 122 retrieves the difference Bluetooth timing information. As described earlier, in one implementation, the Bluetooth device 102 transmits a difference between Bluetooth timing information and a value of a local coexistence timer 106. The flow continues at block 506.

At block 506, the current value 506, the current value of the WLAN coexistence timer is added to the difference Bluetooth timing information. For example, the WLAN coexistence scheduler 122 may access the coexistence timer 116 and determine the value of the coexistence timer 116. The WLAN device 104 can use the coexistence timer 116 to recreate the Bluetooth timing information (e.g., absolute values of start time and stop time of Bluetooth communications, etc.) from the difference Bluetooth timing information. In one implementation, the WLAN coexistence scheduler 122 can add the value of the WLAN coexistence timer 116 to the difference Bluetooth timing information to reconstruct the Bluetooth timing information ("reconstructed Bluetooth timing information"). In another implementation, the WLAN MAC unit 126 generates the reconstructed Bluetooth timing information and provides the reconstructed Bluetooth timing information to the WLAN coexistence scheduler 122. Referring to FIG. 6, an adder 614 on the WLAN device 104 adds the difference Bluetooth timing information to the value of the coexistence timer 616 and reconstructs the Bluetooth timing information. The reconstructed Bluetooth timing information may be a WLAN representation of the Bluetooth timing information. In some implementations, operations for determining the current value of the coexistence timer and adding the current value of the coexistence timer to the difference Bluetooth timing information may be performed in hardware. Likewise, the Bluetooth device 102 also comprises an adder 610 that adds the difference WLAN timing information to the value of the coexistence timer 606 and generates a Bluetooth representation of WLAN timing information. It should also be noted that all additions performed in the WLAN device and in the Bluetooth device are performed modulo to the period of the coexistence timer. Referring back to FIG. 5, after the Bluetooth timing information is recreated on the WLAN device, the flow continues at block 508.

At block 508, WLAN communications are scheduled based on the reconstructed Bluetooth timing information. For example, the WLAN coexistence scheduler 122 may schedule the WLAN communications based on the reconstructed Bluetooth timing information for coexistence purposes. In one implementation, the WLAN coexistence scheduler 122 may store the reconstructed Bluetooth timing information in a coexistence-scheduling table 124. In another implementation, the WLAN coexistence scheduler 122 may store the reconstructed Bluetooth timing information in physical memory (e.g., random access memory, hardware registers, etc). The WLAN coexistence scheduler 122 can schedule communications of the WLAN device 104 based on the reconstructed Bluetooth timing information. The reconstructed Bluetooth timing information could comprise reconstructed timing information of the ongoing Bluetooth communication and reconstructed timing information of subsequent Bluetooth communications. The reconstructed timing information of the ongoing Bluetooth communication can indicate the duration and the stop time of the ongoing Bluetooth communication. The reconstructed timing information of the subsequent Bluetooth communication can indicate the start time, the duration, and the stop time of the subsequent Bluetooth communication. Based on knowledge of the reconstructed timing information of the ongoing Bluetooth communication and the subsequent Bluetooth communication, the WLAN coexistence scheduler 122 can schedule its communications (e.g., determine when the WLAN communication will start, a duration of the WLAN communication, a number of WLAN packets that can be transmitted, etc.) From block 508, the flow ends.

It should be noted that the Bluetooth device 102 and the WLAN device 104 operate using different protocols and also comprise local timers that operate using different time references. For effective synchronization, the local timers on the Bluetooth device 102 and the WLAN device 104 should run at the same frequency and timing information in one time format should be convertible to the other time format. This can be achieved by means of the coexistence timer as described above. FIGS. 7A, 7B, 8A, and 8B describe operations for establishing a relationship between the coexistence timer, the local Bluetooth timer, and the local WLAN timer.

FIG. 7A is a flow diagram illustrating example operations for synchronizing a local Bluetooth timer with a coexistence timer, according to some embodiments. Flow 700 begins at block 702.

Figure 8A:
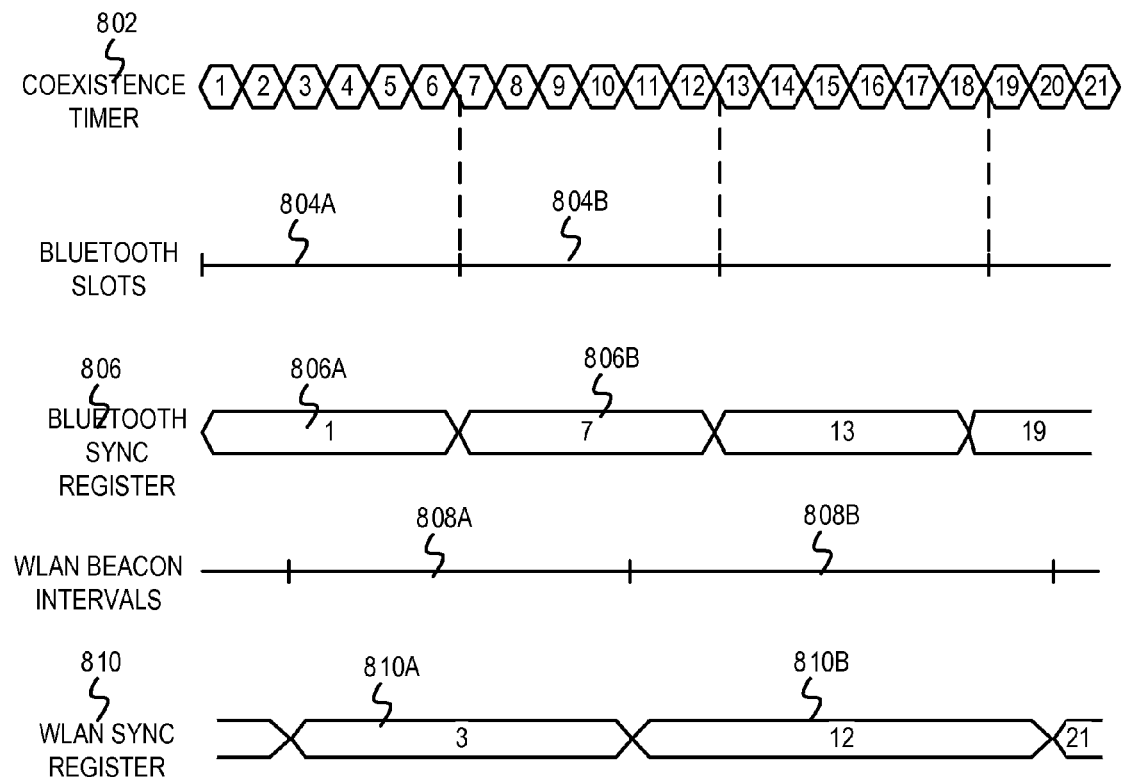
FIG. 8A is a timing diagram illustrating synchronization between a coexistence timer, a local Bluetooth timer, and a local WLAN timer, according to some embodiments.

At block 702, a clock cycle, of the coexistence timer, that corresponds to a start of a Bluetooth slot is determined. At the Bluetooth slot boundary, a current value of the coexistence timer (e.g., the coexistence timer 106 of FIG. 1) may be stored. For example, a trigger may be generated on detecting the start of the Bluetooth slot and a Bluetooth synchronization unit may capture and store the value of the coexistence timer at the start of the Bluetooth slot. FIG. 8A illustrates a relationship between the local Bluetooth timer and a coexistence timer 802, according to some embodiments. In one implementation, the local Bluetooth timer may have a resolution of 312.5 microseconds. As indicated in FIG. 8A, in one implementation, each Bluetooth slot comprises six coexistence timer clock cycles. The start of Bluetooth slot 804A corresponds to clock cycle 1 of the coexistence timer 802, the start of Bluetooth slot 804B corresponds to clock cycle 7 of the coexistence timer 802, and so on. Referring back to FIG. 7A, the flow continues at block 704.

Figure 8B:
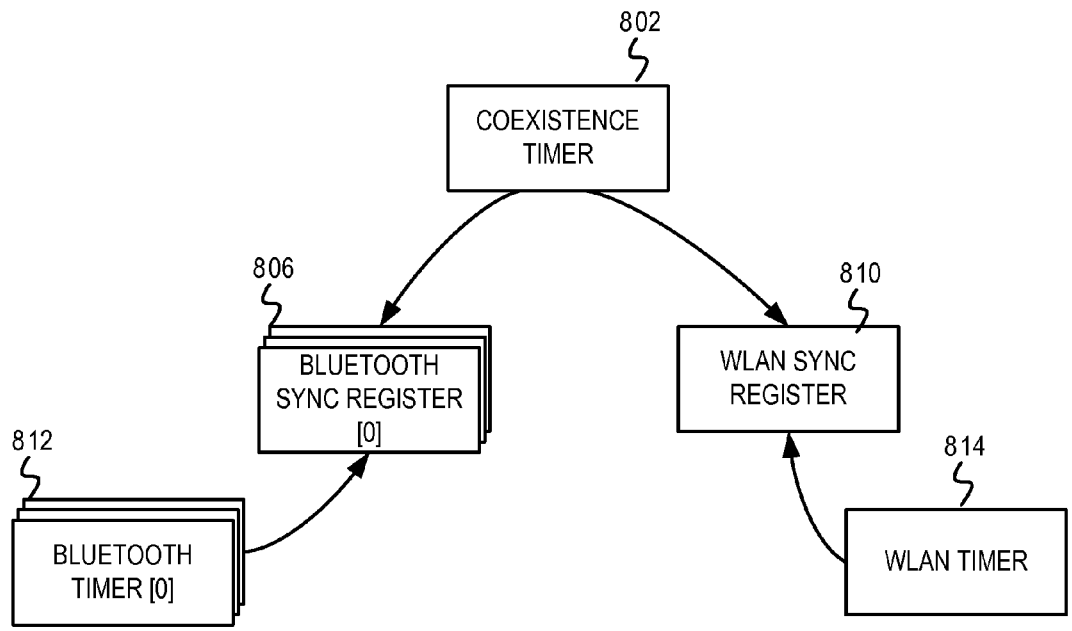
FIG. 8B is an block diagram illustrating example coexistence timing architecture, according to some embodiments.

At block 704, a value of the coexistence timer clock cycle that corresponds to the start of the Bluetooth slot is stored in a Bluetooth sync register associated with the local Bluetooth timer. The Bluetooth sync register defines a relationship between the local Bluetooth timer (e.g., a BtClk timer) and a common time reference shared by the Bluetooth and the WLAN devices (e.g., the coexistence timer). Values of the Bluetooth sync register 806 at various instances of time are indicated FIG. 8A. For example, at the Bluetooth slot 804A, the value 806A in the Bluetooth sync register is "1", at the Bluetooth slot 804B, the value 806B in the Bluetooth sync register is "7", and so on. Referring to FIG. 8B, the Bluetooth device comprises multiple Bluetooth timers 812. Because the Bluetooth device can simultaneously be a part of multiple piconets—each of which may have different timing characteristics; the Bluetooth device uses different Bluetooth timers to keep track of time in each of the multiple piconets. Also, each of the Bluetooth timers 812 may have a different rate of drift, different operating frequency, may be linked to different crystals, etc. Therefore, the Bluetooth device also comprises a distinct Bluetooth sync register 806 associated with each Bluetooth timer 812. The Bluetooth sync register 806 latches the value of the coexistence timer 802 at the Bluetooth slot boundary for each piconet. This enables a Bluetooth coexistence unit (e.g., the Bluetooth coexistence unit 112 of FIG. 1) to translate timing information from a time reference of the Bluetooth timer 812 into a common time reference of the coexistence timer 802 (e.g., for transmission to the WLAN device 104) and timing information in the common time reference (e.g., received from the WLAN device 104) back into the time reference of the Bluetooth timer 812. Referring back to FIG. 7A, the flow continues at block 706.

At block 706, timing information for coexistence events is determined based on the value of the coexistence timer clock cycle in the Bluetooth sync register. In one implementation, the Bluetooth coexistence scheduler 112 may use the value in the Bluetooth sync register to convert WLAN timing information in terms of the local Bluetooth timer. For example, the Bluetooth coexistence scheduler 112 of FIG. 1 may determine a start time for a WLAN communication based on the value of the coexistence timer clock cycle in the Bluetooth sync register. The Bluetooth coexistence scheduler 112 can access the Bluetooth sync register 806 and determine the coexistence timer clock cycle corresponding to the start of a current Bluetooth slot. With knowledge of the coexistence timer clock cycle corresponding to the start of the current Bluetooth slot and WLAN timing information received in terms of coexistence timer clock cycles, the Bluetooth coexistence scheduler 112 can calculate the WLAN timing information in terms of Bluetooth slot cycles. The Bluetooth coexistence scheduler 112 can also use the value latched in the Bluetooth sync register 806 to calculate and transmit Bluetooth timing information in terms of a time reference of the coexistence timer to the WLAN device. For example, the Bluetooth coexistence scheduler 112 may determine that a Bluetooth communication will start in N Bluetooth slots. The Bluetooth coexistence scheduler 112 can calculate the Bluetooth timing information in terms of the common time reference of the coexistence timer by adding the value in the Bluetooth sync register 806 to $(N \cdot t_{slot\_boundary})$, where $t_{slot\_boundary}$ is the duration of the slot boundary. In one implementation, the duration of the slot boundary can be 625 microseconds. The resultant time can be transmitted to the WLAN device. For example, the current value in the Bluetooth sync register may be 1000 and a Bluetooth communication may be scheduled to start in 2 Bluetooth slots (i.e., which, with a slot duration of 625 microseconds, translates to 1250 microseconds). The Bluetooth coexistence scheduler 112 can determine that the Bluetooth timing information in terms of the time reference of the coexistence timer is 2250 microseconds (e.g., 1000+1250) and provide this value to the WLAN device.

As another example, referring to FIG. 4B, Bluetooth packet reception begins at the start of the Bluetooth slot—time instant 452. The Bluetooth sync register 806 latches to the coexistence timer value at the time instant 452. Based on content of the length field 428 in the payload header 406 and the value of the Bluetooth sync register 806, the stop time for the receive packet can be calculated—time instant 455. The Bluetooth device can convert this information, along with other scheduling information such as a start time and a stop time of Bluetooth packet transmission, a start time and a stop time of a next Bluetooth packet reception, etc., into the time reference of the coexistence timer and/or into a difference Bluetooth timing information and transmit the timing information to the WLAN device. Referring back to FIG. 7A, after the timing information for the coexistence events is determined, the flow ends.

FIG. 7B is a flow diagram illustrating example operations for synchronizing a local WLAN timer with a coexistence timer, according to some embodiments. Flow 750 begins at block 752.

At block 752, a clock cycle, of a coexistence timer, that corresponds to a start of a WLAN beacon interval is determined. At the WLAN beacon boundary, a current value of the coexistence timer (e.g., the coexistence timer 116 of FIG. 1 or the coexistence timer 202 of FIG. 2) may be stored. For example, a trigger may be generated on detecting the start of the WLAN beacon interval and a WLAN synchronization unit may capture and store the value of the coexistence timer at the start of the WLAN beacon interval. FIG. 8A illustrates a relationship between the local WLAN timer and the coexistence timer 802. In one implementation, the local WLAN timer may be a time synchronization function (TSF) timer with a resolution of 1 microsecond. As indicated in FIG. 8A, in one implementation, each WLAN beacon interval comprises nine coexistence timer clock cycles. The start of WLAN beacon interval 808A corresponds to clock cycle 3 of the coexistence timer 802, the start of WLAN beacon interval 808B corresponds to clock cycle 12 of the coexistence timer 802, and so on. The flow continues at block 754 in FIG. 7B.

At block 754, a value of the coexistence timer clock cycle that corresponds to the start of the WLAN beacon interval is stored in a WLAN sync register 810 associated with the local WLAN timer. Values of the WLAN sync register 810 at various instances of time are indicated in FIG. 8A. For example, during the WLAN beacon interval 808A, the value 810A in the WLAN sync register is "3", during the WLAN beacon interval 808B, the value 810B in the WLAN sync register is "12", and so on. Referring to FIG. 8B, the WLAN device comprises one local WLAN timer 814. The local WLAN timer 814 may be a TSF timer and may be used to keep track of time in the WLAN device. The WLAN timer 814 is associated with a WLAN sync register 810. The WLAN sync register 810 latches the state of the coexistence timer 802 at the start of the WLAN beacon interval. This enables a WLAN coexistence unit (e.g., the WLAN coexistence unit 122 of FIG. 1) to translate timing information from a time reference of the WLAN timer 814 into a common time reference of the coexistence timer 802 (e.g., for transmission to the Bluetooth device 102) and timing information in the common time reference (e.g., received from the Bluetooth device 102) back into the time reference of the WLAN timer 814. Referring back to FIG. 7B, the flow continues at block 756.

At block 756, timing information for coexistence events is determined based on the value of the coexistence timer clock cycle in the WLAN sync register. As indicated earlier, the WLAN sync register 810 defines a relationship between the local WLAN timer and the coexistence timer 802. With this relationship established, the Bluetooth device 102 and the WLAN device 104 can communicate their respective timing information, for coexistence, in a consistent manner. In one implementation, the WLAN coexistence scheduler 122 may use the value in the WLAN sync register 810 to calculate Bluetooth timing information in terms of the local WLAN timer. For example, the WLAN coexistence scheduler 122 may receive the Bluetooth timing information in terms of a time reference of the coexistence timer 802. The WLAN coexistence scheduler 122 can convert the Bluetooth timing information (e.g., a start time of a Bluetooth communication) in terms of a time reference of the local WLAN timer 814, based on the value of the coexistence timer in the WLAN clock sync register 810. Referring back to FIG. 7B, after the timing information for the coexistence events is determined, the flow ends.

Figure 9:
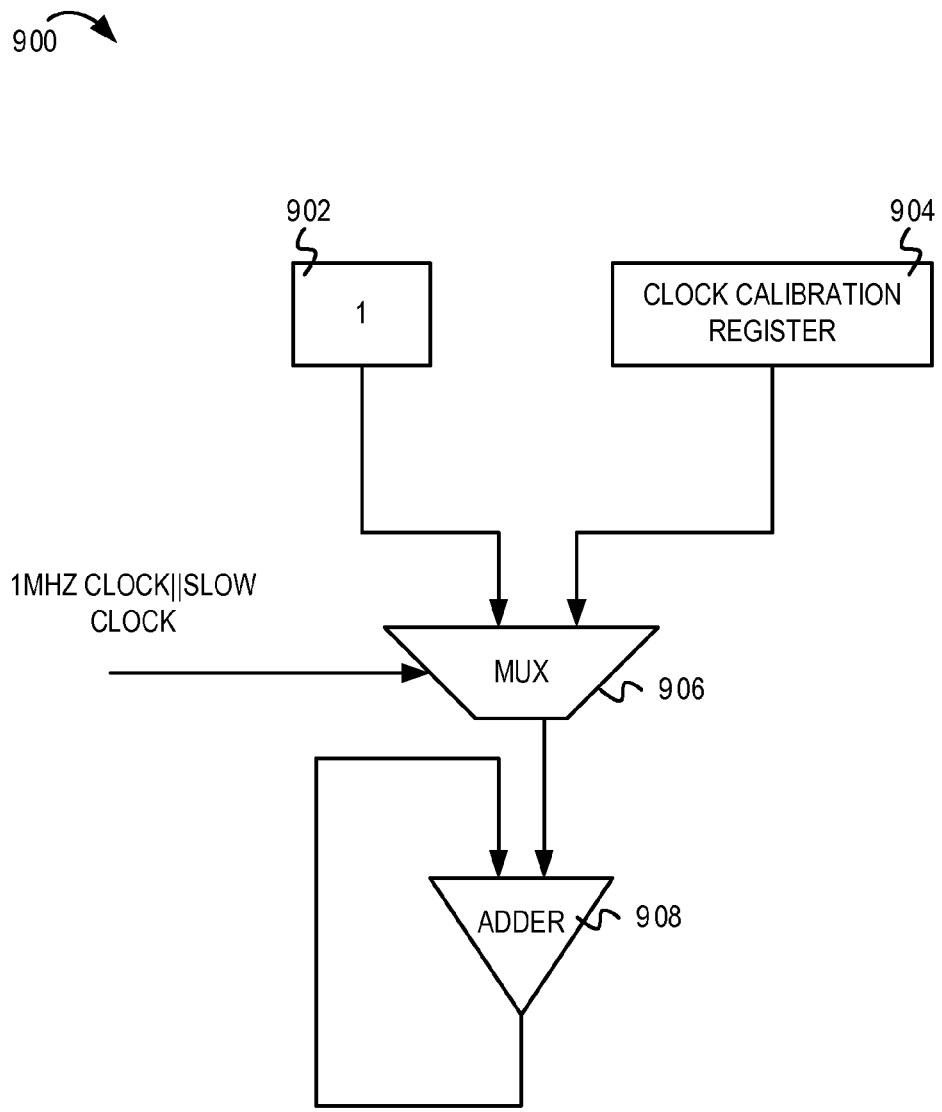
FIG. 9 is a conceptual diagram illustrating calibration of the coexistence timer, according to some embodiments.

FIG. 9 is a conceptual diagram illustrating calibration of the coexistence timer 900, according to some embodiments. As illustrated, in one example, the coexistence timer 900 comprises a reference time 902, and a clock calibration register 904. The reference time 902 and the clock calibration register 904 are provided as inputs to a multiplexer 906. The coexistence timer 900 also comprises adder 908. The output of the multiplexer 906 is either the reference time 902 or the content in the clock calibration register 904. The output of the multiplexer is one input to the adder 908. The output of the adder 908 is fed back as a second input to the adder 908.

The coexistence timer 900 enters a sleep mode or inactive state if both the Bluetooth device and the WLAN device are in the sleep mode. While in sleep mode, timers (e.g., a local Bluetooth timer, a local WLAN timer, and the coexistence timer) may run slower as compared to when the timers are in active mode. In one implementation, in the sleep mode, the only clock source for the communication system comprising the Bluetooth and the WLAN devices may be a slow 32 kHz clock. Timing of various coexistence events (e.g., schedule of a packet transmission, packet reception, etc.) may be communicated without being affected by the timers entering the sleep mode by periodically updating the coexistence timer 900. While in the sleep mode, the coexistence timer 900 may be updated once every slow clock cycle with content of the clock calibration register 904. In one implementation, the coexistence timer 900 may be updated at every falling edge of the clock. The content of the clock calibration register 904 may be determined during active mode and may comprise a number of coexistence timer clock cycles contained in a single slow clock cycle. For example, if the coexistence timer 900 runs at 1 MHz, the content of the clock calibration register 904 is 1. As another example, the content of the clock calibration register is "2" if the coexistence timer 900 runs at 500 kHz. At the falling edge of each clock cycle of the slow clock, the coexistence timer would be incremented two fold, thus updating the coexistence timer so that the coexistence timer progresses at the same speed.

In some embodiments, both the Bluetooth device and the WLAN device comprise two copies of the coexistence timer. In one example, one of the coexistence timers is synchronized to a 1 MHz clock while the other coexistence timer is synchronized to a slower 32 kHz clock. The coexistence timer synchronized to the 1 MHz clock may be operational only during an active power state, while the coexistence timer synchronized to the 32 kHz clock may be operational only during the sleep mode. The current time can be communicated without being affected by Bluetooth devices and WLAN devices switching from an active power state to the sleep mode and vice versa, and consequently without being affected by changes in the local timers. In one example, when transitioning from the sleep mode to the active power state, a copy of the coexistence timer synchronized to the slower 32 kHz clock is copied to the coexistence timer synchronized to the 1 MHz clock. Likewise, when transitioning from the active power state to the sleep mode, a copy of the coexistence timer synchronized to the 1 MHz clock is copied to the coexistence timer synchronized to the slower 32 kHz clock. In one example, the accuracy of the slower 32 kHz clock may be maintained using a low power oscillator circuit.

It should be understood that FIGS. 1-9 are examples meant to aid in understanding embodiments and should not be used to limit embodiments or limit scope of the claims. Embodiments may perform additional operations, fewer operations, operations in a different order, operations in parallel, and some operations differently. For example, the Bluetooth timing information (as determined by the Bluetooth device at block 306 of FIG. 3) might be different from the reconstructed Bluetooth timing information (determined at block 506 of FIG. 5) because of variations in the coexistence timers 106 and 116 on the Bluetooth device 102 and the WLAN device 104 respectively. The variations may be caused if the WLAN device 104 and the Bluetooth device 102 are started or reset at different time instants, if the coexistence timers 106 and 116 are tied to different crystals, etc. However, this may not affect scheduling of either the Bluetooth communications or the WLAN communications because the reconstructed Bluetooth timing information is in terms of the coexistence timer 116 of the WLAN device 104. For example, the coexistence timer 106 on the Bluetooth device 102 may have a value of 1000 microseconds and the Bluetooth timing information may have a value of 2025 microseconds. This would generate a difference time of 1025 microseconds (i.e., 2025−1000). On receiving the difference time of 1025 microseconds, the WLAN device may determine that the coexistence timer 116 on the WLAN device has a value of 2500 microseconds and accordingly calculate reconstructed Bluetooth timing information of 3525 microseconds (i.e., 1025+2500). The WLAN device can relate the reconstructed timing information to its coexistence timer 116 to determine timing information of the coexistence event. Because the WLAN and the Bluetooth devices schedule communications with reference to their respective coexistence timers, different values of the coexistence timers 106 and 116 may not affect operations of the Bluetooth and the WLAN devices. This also precludes the need for exchanging additional information to synchronize the coexistence timers 106 and 116 and maintain the coexistence timers 106 and 116 at a common value.

Also, FIG. 3 describes the Bluetooth device 102 communicating difference Bluetooth timing information for coexistence while FIG. 5 describes the WLAN device 104 receiving and reconstructing the Bluetooth timing information. However, as illustrated in FIG. 6, the WLAN device 104 may also communicate difference WLAN timing information to the Bluetooth device 102, which the Bluetooth device 102 may reconstruct in accordance with the coexistence timer 106 on the Bluetooth device 102.

It should also be noted that the delay associated with transmitting the difference time from the Bluetooth device 102 to the WLAN device 104 and vice versa across the interface might be negligible and much smaller than the resolution of the coexistence timer. The timing information of the coexistence events, therefore, may not be affected by delays associated with transmission across the interface as the Bluetooth and the WLAN devices use the same timing information albeit translated to different time references.

Although FIGS. 3 and 5 describe the Bluetooth device 102 transmitting the difference Bluetooth timing information, in some implementations, for the single chip solution described in FIG. 2, an absolute value of the timing information of the coexistence events may be communicated. In the example of FIG. 2, because the Bluetooth device 102 and the WLAN device 104 share a coexistence timer 202, the Bluetooth device 102 may not calculate and transmit the difference Bluetooth timing information. Instead, the Bluetooth device 102 may convert the timing information of the next Bluetooth communication into a common time reference of the coexistence timer 202 and transmit the timing information to the WLAN device 104.

In one implementation, the operations of calculating the difference time (described with reference to block 308 in FIG. 3) and recalculating the timing information from the difference time (described with reference to block 508 in FIG. 5) may be performed by hardware. For example, the Bluetooth link controller 114 of FIG. 1 may calculate the difference Bluetooth timing information and the WLAN MAC unit 126 may recalculate the Bluetooth timing information from the difference Bluetooth timing information. In some implementations, the Bluetooth coexistence scheduler 112 may calculate the Bluetooth timing information, insert the Bluetooth timing information into a coexistence message, and direct the Bluetooth link controller 114 to transmit the coexistence message to the WLAN device 104. The Bluetooth link controller 114 may extract the Bluetooth timing information from the coexistence message, calculate the difference Bluetooth timing information, insert the difference Bluetooth timing information into the coexistence message, and transmit the coexistence message to the WLAN device. In the WLAN device, the WLAN MAC unit 126 may receive the coexistence message, extract the difference Bluetooth timing information, calculate the Bluetooth timing information from the difference Bluetooth timing information, inset the Bluetooth timing information into the coexistence message, and provide the coexistence message to the WLAN coexistence scheduler 122. The WLAN coexistence scheduler 122 may schedule WLAN communications based on the Bluetooth timing information retrieved from the coexistence message.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 10:
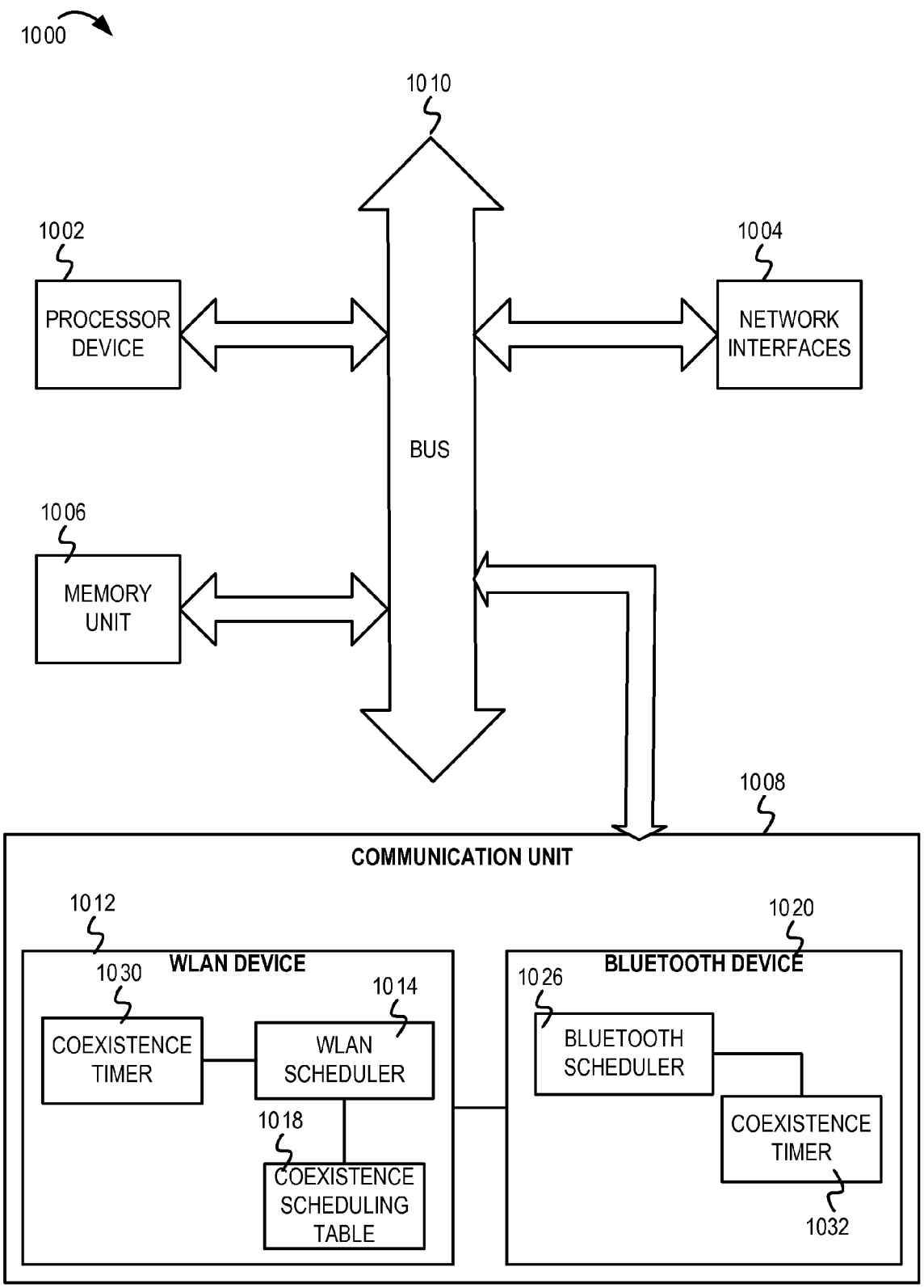
FIG. 10 is a block diagram of a computer system including exchanging coexistence information based on a common coexistence timer, according to some embodiments.

FIG. 10 is a block diagram of a computer system including exchanging coexistence information based on a common coexistence timer, according to some embodiments. In some implementations, the computer system 1000 may be one of a personal computer (PC), a laptop, a netbook, a mobile phone, a personal digital assistant (PDA), or other electronic systems comprising a collocated Bluetooth device 1012 and a WLAN device 1020. The computer system 1000 includes a processor unit 1002 (possibly including multiple processors, multiple cores, multiple nodes, and/or implementing multi-threading, etc.). The computer system 1000 includes a memory unit 1006. The memory unit 1006 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 1000 also includes a bus 1010 (e.g., PCI, ISA, PCI-Express, Hyper-Transport®, InfiniBand®, NuBus, etc.), and network interfaces 1004 that include at least one wireless network interface (e.g., a WLAN interface, a Bluetooth® interface, a WiMAX interface, a ZigBee® interface, a Wireless USB interface, etc.).

The computer system 1000 also includes a communication unit 1008. The communication unit 1008 comprises the Bluetooth device 1020 and the WLAN device 1012. In some implementations, the Bluetooth device 1020 comprises a Bluetooth scheduler 1026 and a coexistence timer 1032. The Bluetooth scheduler 1028 is coupled with the coexistence timer 1032. The WLAN device 1012 comprises a WLAN scheduler 1014, a coexistence timer 1030, and a coexistence-scheduling table 1018. The WLAN scheduler 1014 is coupled with the coexistence timer 1030, and the coexistence-scheduling table 1018. The coexistence timers 1030 and 1032 may be 32-bit timers with a resolution of 1 us and may be used to convert the local Bluetooth and WLAN timing information into a consistent common format. The Bluetooth scheduler 1026 implements functionality to convert Bluetooth timing information from a Bluetooth specific time reference to a common time reference of the coexistence timer 1032. The WLAN coexistence scheduler 1014 can also use the coexistence timer 1030 to convert the Bluetooth timing information in the common time reference to a WLAN specific time reference. The WLAN coexistence unit 1014 may populate the coexistence scheduling able 1018 with the Bluetooth timing information and accordingly schedule WLAN communications. Likewise, the WLAN device 1012 may convert WLAN timing information in accordance with the coexistence timer 1030 and provide it to the Bluetooth device 1020. The Bluetooth device 1020 may calculate a Bluetooth representation of the WLAN timing information and accordingly schedule Bluetooth communications. The Bluetooth device 1020 and the WLAN device 1012 may also perform other operations as described with reference to FIGS. 1-9.

While the embodiments are described with reference to various implementations and exploitations, it will be understood that these embodiments are illustrative and that the scope of the inventive subject matter is not limited to them. In general, a coexistence timer for enabling coexistence in a wireless communication system as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A first wireless network device comprising:
a processor; and
a communication unit communicatively coupled with the processor, the communication unit to:
receive a difference time from a second wireless network device communicatively coupled with the first wireless network device, wherein the difference time is derived from timing information associated with a scheduled communication of the second wireless network device;
determine a clock cycle of a first coexistence timer associated with the first wireless network device, wherein the clock cycle corresponds to a start of a communication interval of the first wireless network device;
determine a first time value and a timing relationship between a local timer of the first wireless network device and the first coexistence timer based at least in part on the clock cycle; and
reconstruct the timing information based at least in part on adding the difference time to the first time value.

2. The first wireless network device of claim 1, wherein the communication unit is further to:
add the first time value to the difference time to generate reconstructed timing information associated with the second wireless network device; and
schedule a communication of the first wireless network device based, at least in part, on the reconstructed timing information.

3. The first wireless network device of claim 2, wherein after generating the reconstructed timing information, the communication unit is to
populate a scheduling table with the reconstructed timing information.

4. The first wireless network device of claim 1, wherein the communication interval comprises at least one member selected from the group consisting of a Bluetooth slot time interval and a wireless local area network (WLAN) beacon time interval, and
each clock cycle of the first coexistence timer comprises one member selected from the group consisting of a predetermined number of Bluetooth slot time intervals and a predetermined number of WLAN beacon intervals.

5. The first wireless network device of claim 1, wherein the communication unit is further to:
reconstruct the timing information in terms of the local timer based at least in part on the timing relationship.

6. The first wireless network device of claim 1, wherein when the first wireless network device is associated with a plurality of communication networks, the communication unit is further to:
store a timing relationship between the first coexistence timer and a local timer of the first wireless network device assigned for communication in the each of the plurality of communication networks.

7. The first wireless network device of claim 1, wherein the difference time is calculated by subtracting a second time value, of a second coexistence timer associated with the second wireless network device, from the timing information.

8. The first wireless network device of claim 7, wherein the first coexistence timer and the second coexistence timer are a common timer shared by the first wireless network device and the second wireless network device.

9. The first wireless network device of claim 7, wherein the first coexistence timer and the second coexistence timer are separate, synchronized coexistence timers.

10. The first wireless network device of claim 1, wherein the timing information comprises at least one member selected from the group consisting of a start time of the scheduled communication, an end time of the scheduled communication, and a duration of the scheduled communication.

11. The first wireless network device of claim 1, wherein the first coexistence timer is configured to switch to a low power operating state when the first wireless network device switches to the low power operating state.

12. The first wireless network device of claim 1, wherein the first wireless network device comprises a first instance of the first coexistence timer and a second instance of the first coexistence timer,
the first instance of the first coexistence timer is synchronized with a sleep mode timer and is operational when the first wireless network device is in a low power operating state,
the second instance of the first coexistence timer is synchronized with an active mode timer and is operational when the first wireless network device is in an active operating state, and the sleep mode timer operates at a lower frequency than the active mode timer.

13. The first wireless network device of claim 12, wherein the communication unit is to is further to:
  copy a value of the first instance of the first coexistence timer into the second instance of the first coexistence timer when the first wireless network device switches from the low power operating state to the active operating state; and
  copy a value of the second instance of the first coexistence timer into the first instance of the first coexistence timer when the first wireless network device switches from the active operating state to the low power operating state.

14. The first wireless network device of claim 1, wherein the first wireless network device is a wireless local area network device and the second wireless network device is a Bluetooth device.

15. The first wireless network device of claim 1, wherein the first wireless network device is a Bluetooth device and the second wireless network device is a wireless local area network device.

16. The first wireless network device of claim 1, wherein the first wireless network device and the second wireless network device comprise at least one member selected from the group consisting of collocated on a common integrated circuit, collocated on a common circuit board, and implemented on distinct integrated circuits in close proximity to each other.

17. A first communication network device comprising:
  a processor unit; and
  a communication unit communicatively coupled with the processor unit, the communication unit to:
    receive a difference time from a second communication network device communicatively coupled with the first communication network device, wherein the difference time is derived from timing information associated with a scheduled communication of the second communication network device;
    determine a clock cycle of a coexistence timer associated with the first communication network device, wherein the clock cycle corresponds to a start of a communication interval of the first communication network device;
    determine a time value of the coexistence timer and a timing relationship between a local timer of the first communication network device and the coexistence timer based at least in part on the clock cycle, wherein the coexistence timer provides a common time reference for the first communication network device and the second communication network device; and
    reconstruct the timing information by adding the time value to the difference time.

18. The first communication network device of claim 17, wherein the communication unit is further to:
  populate a scheduling table with reconstructed timing information of the scheduled communication of the second communication network device, wherein the scheduling table comprises scheduling information of the scheduled communication of the second communication network device; and
  schedule communications of the first communication network device based at least in part on the scheduling table.

19. The first communication network device of claim 17, wherein,
  the communication interval comprises at least one member selected from the group consisting of a Bluetooth slot time interval and a wireless local area network (WLAN) beacon time interval, and
  each clock cycle of the coexistence timer comprises at least one member selected from the group consisting of a predetermined number of Bluetooth slot time intervals and a predetermined number of WLAN beacon intervals.

20. The first communication network device of claim 17, wherein the first communication network device is a wireless local area network device and the second communication network device is a Bluetooth device.

21. A method comprising:
  receiving, at a first wireless network device, a difference time from a second wireless network device communicatively coupled with the first wireless network device, wherein the difference time is derived from timing information associated with a scheduled communication of the second wireless network device,
  determining a clock cycle of a coexistence timer associated with the first wireless network device, wherein the clock cycle corresponds to a start of a communication interval of the first wireless network device;
  determining a time value and a timing relationship between a local timer of the first wireless network device and the coexistence timer based at least in part on the clock cycle; and
  reconstructing, at the first wireless network device, the timing information based at least in part on adding the difference time to the time value.

22. The method of claim 21, further comprising:
  adding the time value to the difference time to generate reconstructed timing information associated with the second wireless network device; and
  scheduling communications of the first wireless network device based, at least in part, on the reconstructed timing information.

23. The method of claim 21, wherein said reconstructing the timing information comprises:
  reconstructing the timing information in terms of the local timer based at least in part on the timing relationship.

24. A non-transitory, machine-readable storage medium having instructions stored thereon, which when executed by a processor of a first network device, cause the first network device to:
  receive a difference time from a second network device communicatively coupled with the first network device, wherein the difference time is derived from timing information associated with a scheduled communication of the second network device;
  determine a clock cycle of a coexistence timer associated with the first network device, wherein the clock cycle corresponds to a start of a communication interval of the first network device;
  determine a time value and a timing relationship between a local timer of the first network device and the coexistence timer based at least in part on the clock cycle; and
  reconstruct the timing information by adding the time value to the difference time.

25. The non-transitory, machine-readable storage medium of claim 24, wherein the instructions executed by the processor cause the first network device to:
  schedule communications of the first network device based, at least in part, on reconstructed timing information associated with the second network device.

26. The non-transitory, machine-readable storage medium of claim 24, wherein the instructions executed by the processor cause the first network device to:
reconstruct the timing information in terms of the local timer based at least in part on the timing relationship between the local timer and the coexistence timer.

27. A first wireless network device comprising:
a processor; and
a communication unit communicatively coupled with the processor, the communication unit to:
determine timing information of a scheduled communication of the first wireless network device;
determine a time value of a coexistence timer, wherein the coexistence timer provides a common time reference for the first wireless network device and a second wireless network device that is communicatively coupled with the first wireless network device;
determine a difference time associated with the timing information based at least in part on the time value; and
provide the difference time to the second wireless network device to indicate a timing associated with the scheduled communication, wherein the coexistence timer is configured to switch to a low power operating state when the first wireless network device switches to the low power operating state.

28. The first wireless network device of claim 27, wherein the communication unit is further to:
determine the difference time by subtracting the time value from the timing information.

29. The first wireless network device of claim 27, wherein the communication unit is further to:
determine a clock cycle of the coexistence timer, wherein the clock cycle corresponds to a start of a communication interval of the first wireless network device;
determine a number of communication intervals of the first wireless network device until a start time of the scheduled communication; and
determine the timing information based, at least in part, on the number of communication intervals and the clock cycle.

30. The first wireless network device of claim 27, wherein
the first wireless network device comprises a first instance of the coexistence timer and a second instance of the coexistence timer,
the first instance of the coexistence timer is synchronized with a sleep mode timer and is operational when the first wireless network device is in the low power operating state,
the second instance of the coexistence timer is synchronized with an active mode timer and is operational when the first wireless network device is in an active operating state, and
the sleep mode timer operates at a lower frequency than the active mode timer.

31. The first wireless network device of claim 30, wherein the communication unit is further to,
copy a value of the first instance of the coexistence timer into the second instance of the coexistence timer when the first wireless network device switches from the low power operating state to the active operating state; and
copy a value of the second instance of the coexistence timer into the first instance of the coexistence timer when the first wireless network device switches from the active operating state to the low power operating state.

32. The first wireless network device of claim 27, wherein the first wireless network device and the second wireless network device comprise at least one member selected from the group consisting of collocated on a common integrated circuit, collocated on a common circuit board, and implemented on distinct integrated circuits in close proximity to each other.

33. The first wireless network device of claim 27, wherein
the first wireless network device is a wireless local area network (WLAN) device and the second wireless network device is a Bluetooth device, or
the first wireless network device is a Bluetooth device and the second wireless network device is a WLAN device.

* * * * *